3,060,580
DENTAL DRILL
Earl J. Wells, Comptche, Calif.
Filed Apr. 13, 1959, Ser. No. 805,826
1 Claim. (Cl. 32—26)

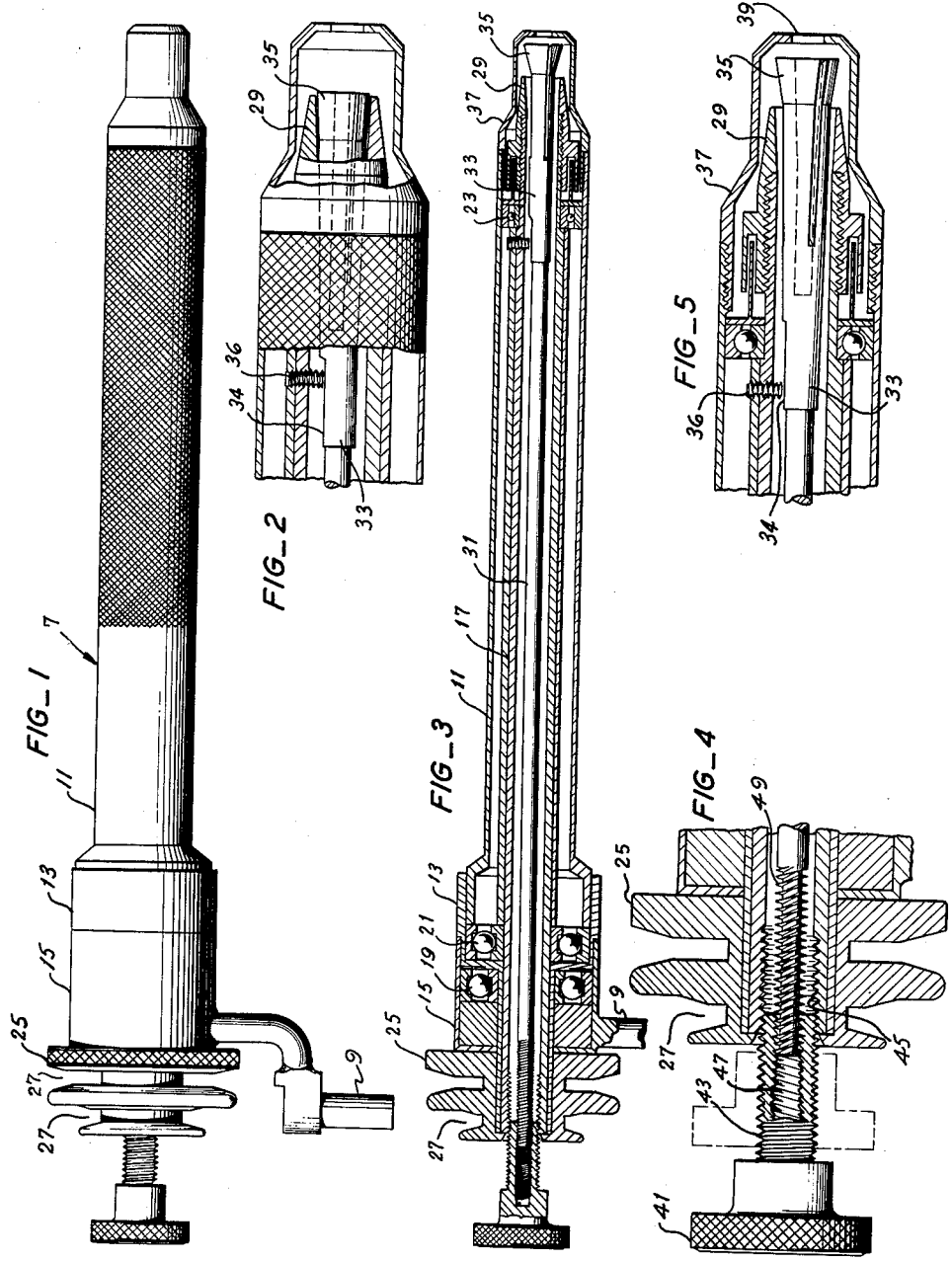
Oct. 30, 1962 — E. J. WELLS — 3,060,580
DENTAL DRILL
Filed April 13, 1959
INVENTOR.
EARL J. WELLS
ECKHOFF & SLICK
ATTORNEYS
BY
A MEMBER OF THE FIRM

United States Patent Office 3,060,580
Patented Oct. 30, 1962

This invention relates to a hand piece for dental machines and, more particularly, relates to a ball bearing hand piece having an improved positive chucking mechanism.

In the past, dental hand pieces have suffered from a lack of positive action in the chucking mechanism. In the mechanism most commonly used, force is applied to a spring collet to cause it to clamp onto a tool in the jaws of the collet, but no positive means is provided for releasing the collet, so that the collet frequently sticks in place.

According to the present invention, an improved structure is provided wherein a positive mechanism actuates the collet in both directions so that the jaws are forced both open and closed.

In the drawings forming a part of this application:

FIGURE 1 is an overall side view of a hand piece embodying the present invention.

FIGURE 2 is a view, partially in section, of the collet end of the hand piece showing the jaws in a closed position.

FIGURE 3 is a view, similar to FIGURE 1, showing the device in section.

FIGURE 4 is an enlarged sectional view of the device which retracts and extends the collet.

FIGURE 5 is a sectional view of the nose of the hand piece, showing the jaws in an open position.

Referring now to the drawings by reference characters, there is shown a hand piece having an outer casing, generally designated 7, to which is attached a conventional wrist arm 9. For ease in manufacture, the outer casing 7 is comprised of three separate members, designated 11, 13 and 15; 11 and 13 form a forced fit with each other, as shown. Member 15 is mounted on ball bearings 19 so it can turn freely on members 13 and 11. Mounted for rotation within the casing 7 is the hollow shaft 17. The shaft 17 is mounted for rotation on the ball bearings 21 and 23. The hollow shaft extends from the outer casing on the left hand side of the drawings and has mounted thereon a knurled wheel 25 so that the shaft can be rotated or held by hand and also pulleys 27 so that the device can be rotated by a source of power, not shown. The opposite end of the hollow shaft 17 terminates in an internal cone 29. Mounted within the hollow shaft 17 is a thrust rod 31, to which is attached a collet 33. The collet 33 terminates in a plurality of conventional collet jaws 35. As is well-known to those skilled in the art, when the collet is extended, as is shown in FIGURE 5, the jaws 35 spring out to an open position, while if the collet is moved to the left, to the position shown in FIGURE 2, the collet jaws 35 are compressed by being drawn into the cone 29 so that the shank of a tool inserted therein will be gripped by the jaws. If desired, a decorative and protective cover 37 having an aperture 39 therein of suitable size to freely receive the shank of a tool may be provided on the outer casing 7.

Turning now to the mechanism by which the collet is actuated and which forms the crux of the present invention, the rear of the hand piece is provided with a thumb screw 41 having threads 43 mating with corresponding threads 45 on the interior of the hollow shaft 17 so that the thumb screw can be readily screwed into and out of the hollow shaft. The thumb screw itself is hollow and internally threaded as at 47 to receive mating threads 49 on the end of the thrust rod 31. In the embodiment illustrated, the thread 43 is a single thread, while the thread 49 is a double thread and both screws have about the same pitch. Thus, the screw 43 had a lead of one as compared with a lead of two for the screw 49. Since the threads 43 and 49 are substantially the same pitch, as the thumb screw 41 is turned into the hollow shaft, into the position shown in dotted lines in FIGURE 4, the screw 49 turns into the threads 45 at a faster rate, so that the net result is that as the screw 41 moves to the right, the screw 49 moves to the left and vice versa. Of course, both threads are of the same hand and normally two right-handed threads are used.

The collet 33 has one flat side 34 and cooperating with this flat side is a projecting screw 36. The collet 33 can thus slide back and forth relative to the hollow shaft 17, but is prevented by the set screw 36 from turning relative thereto.

When one wishes to insert a tool into the hand piece, the thumb screw 41 is turned out to the position shown in solid lines in FIGURE 4, so that the thrust rod 31 moves to the right, as is shown in FIGURE 5, causing the jaws 35 of the collet 33 to spring open. The tool is then inserted, and the screw 41 is run into the hollow shaft, to the position shown in dashed lines in FIGURE 4, which causes the thrust rod 31 to move to the left, causing the jaws to close, as is shown in FIGURE 2, thus gripping a tool within the jaws. When the screw 41 is turned in the opposite direction, the thrust rod 31 is not merely released, but is positively forced to the right.

It is apparent from the above that I have provided a hand piece for dental machines wherein a simple mechanism provides positive control of the collet, forcing it to both the open and closed positions.

Although in describing the invention I have stated that the threaded member 43 has a lead of one while that of 49 has a lead of two, it will be obvious to those skilled in the art that the same results will be achieved by any combination whereby one turn of the thumb screw 41 results in a shorter travel of the thumb screw than it does of the thrust rod 31. Thus, single thread screws could be used at both 43 and 49, provided the screw 49 had a greater pitch and more lead than the screw 43, or some other combination could be used, such as a double thread for the screw 43 and a triple thread for the screw 49.

I claim:

A dental engine hand piece comprising an outer casing, a hollow shaft having a cylindrical opening therethrough with the exterior of said shaft concentric with said opening mounted on ball bearings near each end thereof for rotation within said casing, said hollow shaft terminating near one end of said casing in an internal taper collet sleeve and extending beyond said casing at the opposite end, a thrust rod mounted within said hollow shaft having an external taper collet attached at one end thereof, said collet fitting within said internal taper collet sleeve opening, said thrust rod having means for holding the same against turning movement relative to said hollow shaft, a thumb screw having external threads threadably mounted in the end of said hollow shaft extending beyond said casing, said thumb screw having a hollow center with internal threads threadably engaged with threads on the end of said thrust rod, the lead of said external threads benig less than the lead of said internal threads whereby as said thumb screw is turned relative to said hollow shaft moving said thumb screw axially in relation to said hollow shaft, said thrust rod is moved in the opposite direction relative to said hollow shaft.

References Cited in the file of this patent

UNITED STATES PATENTS

| | | |
|---|---|---|
| 1,697,576 | Shotten et al. | Jan. 1, 1929 |
| 1,839,289 | Angell | Jan. 5, 1932 |

FOREIGN PATENTS

| | | |
|---|---|---|
| 31,215 | Norway | Oct. 4, 1920 |